United States Patent
Nagai et al.

Patent Number: 5,889,099
Date of Patent: Mar. 30, 1999

[54] THERMOPLASTIC RESIN COMPOSITION IMPROVED IN TERMS OF PREVENTION OF MOLD CONTAMINATION

[75] Inventors: Takayuki Nagai, Toyota; Toshio Niimi, Nagoya; Yukihito Zanka, Yokkaichi; Ikuo Tsutsumi, Yokkaichi; Hiroki Sato, Yokkaichi, all of Japan

[73] Assignees: Japan Polychem Corporation, Tokyo-To; Toyota Jidosha Kabushiki Kaisha, Toyota, both of Japan

[21] Appl. No.: 804,403

[22] Filed: Feb. 21, 1997

[30] Foreign Application Priority Data

Feb. 22, 1996 [JP] Japan ................................. 8-035232

[51] Int. Cl.$^6$ ................................. C08J 5/10; C08K 3/34; C08L 23/16
[52] U.S. Cl. ................................. 524/451; 524/99; 524/128; 524/130; 524/132; 524/136; 524/327
[58] Field of Search ................................. 524/451, 99, 128, 524/130, 132, 136, 327; 525/89

[56] References Cited

U.S. PATENT DOCUMENTS

| | | | |
|---|---|---|---|
| 4,345,046 | 8/1982 | Ejk et al. | 524/223 |
| 4,774,275 | 9/1988 | Hisano et al. | 524/370 |
| 5,414,030 | 5/1995 | Kotani et al. | 524/99 |

FOREIGN PATENT DOCUMENTS

| | | |
|---|---|---|
| 0 509 662 | 10/1992 | European Pat. Off. . |
| 0 531 054 | 3/1993 | European Pat. Off. . |
| 0 651 014 | 5/1995 | European Pat. Off. . |
| 2 097 408 | 11/1982 | United Kingdom . |

*Primary Examiner*—James J. Seidleck
*Assistant Examiner*—U. K. Rajguru
*Attorney, Agent, or Firm*—Oblon, Spivak, McClelland, Maier & Neustadt, P.C.

[57] ABSTRACT

A thermoplastic resin composition improved in terms of prevention of mold contamination, comprising the following components (A) to (G):

component (A): 55 to 75% by weight of a propylene-ethylene block copolymer including a propylene homopolymer moiety having a melt flow rate of 15 to 50 g/10 min. and an isotactic pentad fraction of at least 0.97, said block copolymer having a melt flow rate of 10 to 30 g/10 min. and an ethylene content of 2 to 6% by weight, component (B): 0 to 10% by weight of an ethylene-propylene copolymer rubber having a melting temperature of 30° to 60° C. and a melt flow rate of 0.2 to 2 g/10 min., component (C): 5 to 15% by weight of an ethylene-α-olefin copolymer rubber having a melting temperature of 60° to 100° C. and a melt flow rate of 0.3 to 2 g/10 min., component (D): 15 to 25% by weight of a talc having an average particle diameter of up to 5 μm and a specific surface area of at least 3.5 m$^2$/g, the total amount of components (A) to (D) being 100% by weight, component (E): 0.05 to 2 parts by weight of a hindered amine having a structure represented by the following formula (I):

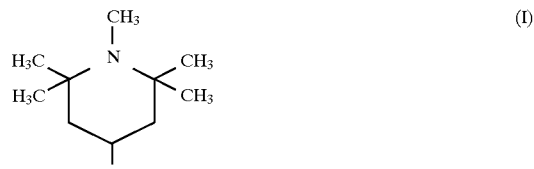

(I)

component (F): 0.01 to 1 part by weight of a triaryl phosphite, and component (G): 0.05 to 4 parts by weight of a metal salt represented by the following general formula (VIII):

$(RCOO)_2X$        (VIII)

wherein R is a monovalent hydrocarbon group having a molecular weight of 290 to 500, and X is zinc, magnesium or calcium, the respective amounts of components (E) to (G) being based on 100 parts by weight of the sum of components (A) to (D).

6 Claims, No Drawings

THERMOPLASTIC RESIN COMPOSITION IMPROVED IN TERMS OF PREVENTION OF MOLD CONTAMINATION

BACKGROUND OF THE INVENTION

1. Field of the Invention

This invention relates to a thermoplastic resin composition comprising a propylene-ethylene block copolymer, an ethylene-propylene copolymer rubber, an ethylene-α-olefin copolymer resin, talc, and a specific additive admixture, which is excellent in terms of processability on injection molding and in the appearance of a molded product, has good flexural modulus, heat resistance, surface hardness, impact resistance and elongation in tension, is improved in terms of mold contamination, and thus is particularly suited for the production of injection-molded products such as automotive interior trims.

2. Background Art

So far, numerous attempts have been made to increase the impact resistance and rigidity of polypropylene resins by the addition thereto of ethylene-propylene copolymers, various ethylene copolymers, and talc. For instance, compositions having excellent impact resistance are known from JP-B-63-42929, JP-A-64-150, JP-A-64-66263, and JP-A-1-204946.

However, the composition set forth in the above JP-B-63-42929 is insufficient in flexural modulus and heat resistance due to the use of a polypropylene of not so high crystallinity. The compositions described in JP-A-64-150, JP-A-64-66263 and JP-A-1-204946, because of their low talc content, are suited for some applications, e.g., bumpers but their flexural modulus is too low for interior trims.

Furthermore, JP-B-4-159345 discloses an ethylene-α-olefin copolymer composition containing a large amount of inorganic filler. This composition has a high specific gravity, and thus is not preferred in the light of weight reduction of automobiles.

On the other hand, there is the following problem with the conventional talc-containing polypropylene composite materials at the time of their molding. Thus, during the long-term continuous molding of the composite materials, bleedouts are gradually deposited on molds, which adversely affects the appearance of a product. Especially, when a mold with an embossed surface is employed, the concaves in the embossed surface are filled with bleedouts, whereby the resulting molded product undesirably exhibits a high gloss.

A propylene polymer which provides a solution to this problem while maintaining the physical properties has been proposed in JP-A-5-209094 and JP-A-6-17982. However, this polymer utilizes no weathering agent. In view of the fact that stabilizers used for improving weather resistance usually exert an adverse influence on the contamination of molds, there is still left much to be desired.

An object of the present invention is to provide a thermoplastic resin composition which is improved in terms of prevention of mold contamination while having high fluidity, excellent moldability and good physical properties, and is especially suited for the production of injection-molded automotive interior trims such as an instrument panel.

SUMMARY OF THE INVENTION

It has now been found that the above object can be achieved, according to the present invention, by a thermoplastic resin composition improved in terms of prevention of mold contamination, comprising the following components (A) to (G):

component (A): 55 to 75% by weight of a propylene-ethylene block copolymer including a propylene homopolymer moiety having a molt flow rate or MFR of 15 to 50 g/10 min. and an isotactic pentad fraction of at least 0.97, said block copolymer having an MFR of 10 to 30 g/10 min. and an ethylene content of 2 to 6% by weight, component (B): 0 to 10% by weight of an ethylene-propylene copolymer rubber having a melting temperature of 30° to 60° C. and an MFR of 0.2 to 2 g/10 min., component (C): 5 to 15% by weight of an ethylene-α-olefin copolymer rubber having a melting temperature of 60 to 100° C. and an MFR of 0.3 to 2 g/10 min., component (D): 5 to 25% by weight of a talc having an average particle diameter of up to 5 μm and a specific surface area of at least 3.5 m²/g, the total amount of components (A) to (D) being 100% by weight, component (E): 0.05 to 2 parts by weight of a hindered amine having a structure represented by the following formula (I);

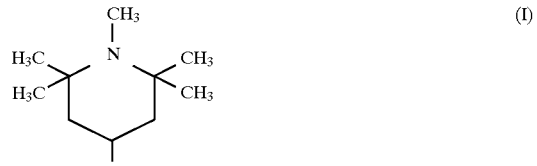

component (F): 0.01 to 1 part by weight of a triaryl phosphite, and component (G): 0.05 to 4 parts by weight of a metal salt represented by the following general formula (VIII):

$$(RCOO)_2X \quad (VIII)$$

wherein R is a monovalent hydrocarbon group having a molecular weight of 290 to 500, and X is zinc, magnesium or calcium, the respective amounts of components (E) to (G) being based on 100 parts by weight of the sum of components (A) to (D).

The thermoplastic resin composition of the present invention, due to the use of the specific components at the specific blending ratio, is excellent in injection moldability and in the appearance of a molded product, has good flexural modulus, impact resistance, elongation in tension, heat resistance and surface hardness, is improved in terms of mold contamination, and thus is especially suited for the production of injection-molded automotive interior trims.

DETAILED DESCRIPTION OF THE INVENTION

[I] Components (A) Propylene-Ethylene Block Copolymer (Component (A))

Physical Properties of Propylene-Ethylene Block Copolymer

The propylene-ethylene block copolymer (component (A)) to be used in the present invention has a melt flow rate (MFR—measured at 230° C. under a load of 2.16 kg) of 10 to 30 g/10 min., preferably 12 to 28 g/10 min., and more preferably 15 to 25 g/10 min.

If the MFR of the propylene-ethylene block copolymer is below the lower limit of the above range, there will then be obtained a composition poor in fluidity. For molding such a composition into a thin molded article, the use of a molding machine having a large clamping force or an increase in molding temperature is required.

If the MFR of the propylene-ethylene block copolymer exceeds the upper limit of the above range, there will then be obtained a composition having an insufficient impact resistance.

The above MFR of the propylene-ethylene block copolymer may be adjusted during polymerization, or may be adjusted after polymerization using organic peroxides such as diacyl peroxides and dialkyl peroxides.

The above propylene-ethylene block copolymer has an ethylene content of 2 to 6% by weight, preferably 3 to 6% by weight, with the random copolymer moiety preferably having an ethylene content of 30 to 50% by weight.

An ethylene content below the lower limit of the above range will provide a composition having a poor heat resistance, and an ethylene content exceeding the upper limit will provide a composition having poor flexural modulus and surface hardness.

The propylene homopolymer moiety of the propylene-ethylene block copolymer has an MFR of 15 to 50 g/10 min., preferably 17 to 45 g/10 min., more preferably 20 to 40 g/10 min., and an isotactic pentad fraction of at least 0.97, preferably at least 0.975, more preferably 0.98 to 0.99.

When the MFR of the propylene homopolymer is below the lower limit of the above range, the resulting composition has a low MFR and thus has a poor moldability. An MFR exceeding the upper limit of the above range, on the other hand, will result in poor impact resistance of the composition flexural modulus.

An isotactic pentad fraction (P) of the propylene homopolymer moiety falling below the lower limit of the above range will provide a composition having an insufficient.

The term "isotactic pentad fraction (P)" herein refers to the isotactic fraction of a pentad unit in the polypropylene molecular chain, determined by using $^{13}$C-NMR.

Preparation of Propylene-Ethylene Block Copolymer

A catalyst of high stereoregularity is used for the preparation of the propylene-ethylene block copolymer.

Such a catalyst may typically be prepared by a method wherein a titanium trichloride composition obtained by reducing titanium tetrachloride with an organoaluminum compound, followed by treatment with an electron donor and an electron acceptor, is combined with an organoaluminum compound and an aromatic carboxylate (see JP-A-56-100806, JP-A-56-120712, and JP-A-58-104907), or a method wherein titanium tetrachloride and an electron donor are brought into contact with a magnesium halide (see JP-A-57-63310, JP-A-63-43915, and JP-A-63-83116).

The block copolymerization of propylene and ethylene may be conducted by the vapor-phase fluidized bed, solution, slurry and the like methods in the presence of the above catalyst.

Quantitative Ratio

It is important that the amount of the above propylene-ethylene block copolymer used lies within the range of, on the basis of the total amount of the above components (A) to (D), 55 to 75% by weight, preferably 56 to 70% by weight, more preferably 60 to 70% by weight.

At an amount below the lower limit of the above range a composition poor in flexural modulus will be obtained, whereas at an amount exceeding the upper limit of the above range a composition of decreased impact resistance will be obtained.

(B) Ethylene-Propylene Copolymer Rubber (Component (B))

Physical Properties of Ethylene-Propylene Copolymer Rubber

The ethylene-propylene copolymer rubber (component (B)) usable in the present invention has a melt flow rate (or MFR as measured at 230° C. under a load of 2.16 kg) of 0.2 to 2 g/10 min., and preferably 0.3 to 1.5 g/10 min.

If the MFR of the above copolymer rubber is below the lower limit of the above range, there will then be obtained a composition having decreased impact resistance. At an MFR exceeding the upper limit of the above range, on the contrary, there will then be obtained too glossy a composition that is not suitable for applications where matted appearances are needed.

It is also important that the ethylene-propylene copolymer rubber has a suitable amount of crystalline segment in its molecule. To this end use is made of an ethylene-propylene copolymer rubber having a melting temperature of 30° to 60° C., preferably 35° to 55° C., more preferably 40° to 50° C. as measured by a differential scanning calorimeter (DSC).

The use of a copolymer rubber having a melting temperature below the lower limit of the above range provides a composition having a low crystallinity and an insufficient surface hardness, whereas the use of a copolymer rubber having a melting temperature exceeding the upper limit of the above range is not suitable because a composition poor in impact resistance is obtained.

In view of impact resistance and surface hardness, it is preferable that the ethylene-propylene copolymer rubber has a propylene content of 12 to 30% by weight, especially 15 to 25% by weight.

This ethylene-propylene copolymer rubber may contain ethylidene norbornene, 1,4-hexadiene, dicyclopentadiene, etc. as a third ingredient.

In the present invention, the ethylene-propylene copolymer rubber may be used singly or in admixture of two or more kinds.

Preparation of Ethylene-Propylene Copolymer Rubber

The above ethylene-propylene copolymer rubber may be obtained by the copolymerization of ethylene and propylene using the known methods such as the vapor-phase fluidized bed, solution, and slurry methods in the presence of an ionic polymerization catalyst such as a Ziegler or Phillips catalyst, optionally with the addition of a third ingredient.

Quantitative Ratio

It is important that the above ethylene-propylene copolymer rubber is incorporated in the thermoplastic resin composition at an amount of 0 to 10% by weight, preferably 2 to 8% by weight, and more preferably 3 to 6% by weight.

If the amount of the copolymer rubber incorporated exceeds the upper limit of the above range, the surface hardness of a composition will then be likely to drop.

(C) Ethylene-α-Olefin Copolymer Rubber (Component (C))

Physical Properties of Ethylene-α-Olefin Copolymer Rubber

The ethylene-α-olefin copolymer rubber usable in the present invention has a melting temperature at 60° to 100° C., preferably 65° to 90° C., more preferably 70° to 80° C. as measured with a differential scanning calorimeter (DSC).

If the melting temperature is below the lower limit of the above range, there will then be obtained a composition of low crystallinity and insufficient surface hardness. If the melting temperature exceeds the upper limit thereof, on the contrary, there will then be obtained a composition poor in impact resistance.

The ethylene-α-olefin copolymer rubber has a melt flow rate (MFR, as measured at 230° C. under a load of 2.16 kg) of 0.3 to 2 g/10 min., preferably 0.4 to 1.9 g/10 min.

If MFR is below the lower limit of the above range, there will then be obtained a composition decreased in terms of physical properties such as Izod impact strength. If the MFR exceeds the upper limit thereof, on the contrary, the effect of improving impact resistance will then become small.

For the α-olefin to be copolymerized with ethylene, mention is made of α-olefins having 4 to 12, preferably 4 to 8 carbon atoms, typically 1-butene, 3-methyl-1-butene, 1-pentene, 1-hexene, and 1-heptene. Among these, particular preference is given to a copolymer with 1-butene because it provides a composition well balanced between, impact resistance, elongation in tension and surface hardness. The α-olefins may be used singly or in combination of two or more, i.e., a multi-component copolymer may be used. Further, such multi-component copolymers may also be used that use propylene in addition to the α-olefin having 4 to 12 carbon atoms.

The ethylene-α-olefin copolymer rubber should preferably have a density below 0.90 g/cm$^3$, especially 0.87 to 0.89 g/cm$^3$, because the resulting composition is more improved in terms of impact resistance and surface hardness.

The ethylene-α-olefin copolymer rubber may be used singly or as a mixture of two or more.

Preparation of Ethylene-α-Olefin Copolymer Rubber

The above ethylene-α-olefin copolymer rubber may be obtained by the copolymerization of ethylene and an α-olefin using the known methods such as the vapor-phase fluidized bed, solution and slurry methods in the presence of an ionic polymerization catalyst such as a Ziegler or Phillips catalyst. Insofar as the melting temperature lies within the above range, the α-olefin content of the copolymer rubber is not particularly limited. In view of impact resistance and surface hardness, however, it is preferred that the α-olefin content ranges from 5 to 25% by weight, and especially from 17 to 23% by weight.

Quantitative Ratio

It is important to incorporate the above ethylene-α-olefin copolymer rubber in the thermoplastic resin composition at an amount of 5 to 15% by weight, preferably 6 to 13% by weight, and more preferably 6 to 12% by weight.

If the amount of the copolymer rubber is below the lower limit of the above range, there will then be obtained a composition of decreased impact resistance, whereas if the amount of the copolymer rubber exceeds the upper limit thereof, there will then be obtained a composition of decreased surface hardness.

(D) Talc (Component (D))

Physical Properties of Talc

The talc (component (D)) to be used in the present invention has an average particle diameter of up to 5 μm, and preferably 0.5 to 3 μm, and a specific surface area of at least 3.5 m$^2$/g, and preferably 3.5 to 6 m$^2$/g. If these parameters are outside the above ranges, there will then be obtained a composition of lowered impact resistance.

The average particle diameter may be determined by reading, at a 50% cumulation, a particle diameter value from a particle size cumulation curve obtained by use of a liquid phase sedimentation type of photo extinction method (using a CP model made by SHIMADZU CORP. as an example).

The specific surface area may be determined from a measurement obtained by use of an air-permeability method (using a constant pressure air-permeation type of specific surface area meter SS-100 made by SHIMADZU CORP. as an example).

Generally, the talc used in the present invention may be prepared by dry pulverization, and then dry classification.

The talc may have been surface-treated with various organic titanate types of coupling agents, silane coupling agents, fatty acids, metal salts of fatty acids, fatty acid esters or the like for the purpose of improving its adhesion to, and its dispersibility in, the polymers.

Quantitative Ratio

The amount of the talc incorporated ranges from 15 to 25% by weight, and preferably 17 to 23% by weight.

If the amount of the talc incorporated is below the lower limit of the above range, there will then be obtained a composition poor in flexural modulus, whereas if the amount of the talc incorporated exceeds the upper limit thereof, there will then be obtained a composition having too large a specific gravity.

(E) Hindered Amine Component (Component (E))

The thermoplastic resin composition of the present invention contains as a weather-resistant agent a hindered amine having a structure represented by the following formula (I):

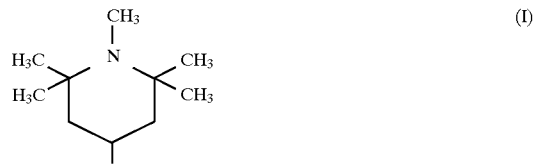

(I)

The above hindered amines include those having the general formulae (II) to (IV) shown below:

(II)

wherein R1 represents the above formula (I), and m is 1 or

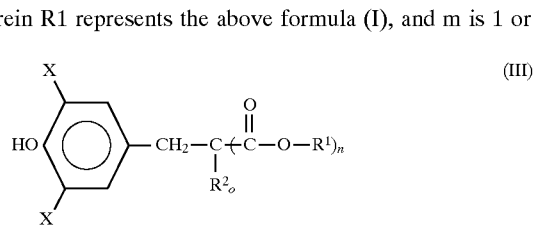

(III)

wherein X represents t-butyl, R$^1$ represents the above formula (I), R$^2$ represents an alkyl group having 3 or more carbon atoms, n is an integer of 1 to 3 and 0 is an integer of 0 to 2, provided that n+0=3;

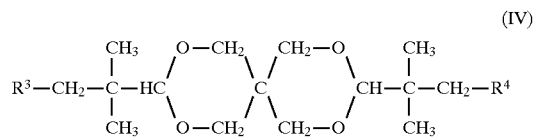

(IV)

wherein R$^3$ and R$^4$ each represent

(V)

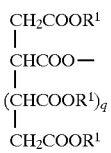

where $R^1$ represents the above formula (I), and p and q each are an integer of 1 or 2.

Specific examples of the hindered amine include tetrakis (1,2,2,6,6-pentamethyl-4-piperidyl)-1,2,3,4-butane tetracarboxylate; tris(1,2,2,6,6-pentamethyl-4-piperidyl)-monostearyl-1,2,3,4-butane tetracrboxylate, distearate, tristearate, and mixtures thereof; bis(1,2,2,6,6-pentamethyl-4-piperidyl-2-butyl-2-(3,5-di-t-butyl-4 -hydroxybenzyl) malonate; condensates of tris(1,2,2,6,6-pentamethyl-4-piperidyl-1,2,3,4-butane tetracarboxylate and β,β,β',β'-tetramethyl-3,9-[2,4,8,10-tetraoxaspiro(5,5)undecane] diethanol; and condensates of N,N'-bis(3-aminopropyl) ethylenediamine and 2,4-bis[N-butyl-N-(1,2,2,6,6-pentamethyl-4-piperidyl)amino]-6-chloro-1,3,5-triazine.

Among these hindered amine compounds, particular preference is given to tetrakis(1,2,2,6,6-pentamethyl-4-piperidyl)-1,2,3,4-butane tetracarboxylate, and bis(1,2,6,6-pentamethyl-4-piperidy1-2-butyl-2-(3,5-di-t-butyl-4-hydroxybenzyl) malonate as well as condensates of tris(1, 2,2,6,6-pentamethyl-4-piperidyl-1,2,3,4-butane tetracarboxylate and β,β,β',β'-tetramethyl-3,9-[2,4,8,10-tetraoxaspiro(5,5)undecane]diethanol, because they can manifest weather resistance without contamination of molds.

The amount of the hindered amine stabilizer used lies within the range of 0.05 to 2 parts by weight, preferably 0.08 to 0.5 parts by weight, and more preferably 0.1 to 0.3 parts by weight per 100 parts by weight of components (A) to (D).

If the amount of the stabilizer exceeds the upper limit of the above range, molds will then be unfavorably contaminated, whereas if the amount of the stabilizer is below the lower limit, its practical weather resistance performance will then drop.

(F) Triaryl Phosphite Component (Component (F))

The thermoplastic resin composition of the present invention contains a triaryl phosphite as an anti-oxidant.

The triaryl phosphite may be one represented by the following general formula (VII):

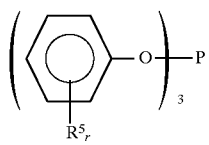

wherein $R^5$ represents a hydrocarbon group having 4 to 10 carbon atoms, and r is 1, 2 or 3.

Examples of the triaryl phosphite include triphenyl phosphite, tris(nonylphenyl) phosphite, tris (dinonylphenyl) phosphite, tris-(p-t-butylphenyl) phosphite, and tris-(2,4-di-t-butylphenyl) phosphite.

Among these compounds, it is preferable to use tris-(2, 4-di-t-butylphenyl) phosphite in the light of its resistance to hydrolysis, stability upon molding at a high temperature and prevention of mold contamination.

The amount of the triaryl phosphite used lies within the range of 0.01 to 1 part by weight, preferably 0.01 to 0.5 parts by weight, and more preferably 0.01 to 0.15 parts by weight per 100 parts by weight of components (A) to (D).

If the amount of the triaryl phosphite exceeds the upper limit of the above range, molds will then be unfavorably contaminated, whereas if the amount of the triaryl phosphite is below the lower limit, the stability of the resulting composition upon molding will then become worse.

(G) Metal Salt Component (Component (G))

The thermoplastic resin composition of the present invention contains as a dispersant a metal salt represented by the following general formula (VIII):

$$(RCOO)_2X \qquad (VIII)$$

wherein R is a monovalent hydrocarbon group having a molecular weight of 290 to 500, preferably 290 to 400, and X is zinc, magnesium or calcium.

The above metal salt is used as a dispersant for both talc and a pigment to be used for coloration. To achieve a further improved prevention of mold contamination, it is important to use the metal salt represented by the above general formula.

If the molecular weight of the above R is less than the lower limit of the above range, molds will then be likely to be contaminated, whereas if the molecular weight of R exceeds the upper limit, the dispersibility of the talc and pigment will then become worse.

Examples of the metal salt include calcium, magnesium, and zinc salts of behenic acid, montanic acid, mellisic acid, cerotic acid and lignoceric acid.

Preferred among these metal salts are the calcium, magnesium, and zinc salts of behenic acid as well as the zinc, magnesium, and calcium salts of montanic acid.

The amount of the metal salt incorporated lies within the range of 0.05 to 4 parts by weight, preferably 0.1 to 2 parts by weight, and more preferably 0.2 to 1 part by weight per 100 parts by weight of components (A) to (D).

If the amount of the metal salt exceeds the upper limit of the above range, molds will then be unfavorably contaminated, whereas if the amount of the metal salt is below the lower limit, the physical properties of the resulting composition will be lowered due to a drop of the dispersibility of the pigment, talc, or the like.

(H) Additional (Optional) Components

Besides the above essential components (A) to (G), the thermoplastic resin composition of the present invention may contain additional components with the proviso that they have little, if any, adverse influence on the intended effect according to the present invention.

Examples of the additional components may include phenolic anti-oxidants; coloring materials such as quinacridone, perylene, phthalocyanine and carbon black; and fibrous materials such as fibrous potassium titanate, fibrous magnesium oxysulfate, fibrous aluminum borate, a whisker form of calcium carbonate, carbon fibers, and glass fibers.

[II] Preparation of Thermoplastic Resin Composition (1) Kneading

The thermoplastic resin composition of the present invention can be prepared by kneading the above components together at normal temperature using extruders, Banbury mixers, rolls, Brabender Plastographs, kneaders, etc. It is particularly preferable to prepare the thermoplastic resin composition using an extruder, especially a twin-screw extruder.

(2) Molding

Methods of molding the thermoplastic resin composition of the present invention are not critical. In view of the effect of the present invention achieved, however, it is particularly preferable to use injection molding.

[II] Thermoplastic Resin Composition (1) Physical Properties

The thermoplastic resin composition of the present invention is excellent in injection moldability as well as in the appearance of a molded product, has good flexural modulus, impact resistance, elongation in tension, surface hardness and heat resistance, and is improved in terms of prevention of mold contamination.

The composition of the present invention generally possesses the following physical properties:

(a) MFR:
at least 8 g/10 min., preferably at least 9 g/10 min.
(b) Flexural Modulus:
at least 20,000 kg/cm$^2$, preferably at least 21,000 kg/cm$^2$
(c) Izod Impact Value (at 23° C.):
at least 15 kg·cm/cm, preferably at least 17 kg·cm/cm
(d) Elongation in Tension:
at least 200%, preferably at least 210%
(e) Heat Deformation Temperature:
at least 120° C., preferably at least 125° C.
(f) Rockwell Hardness:
at least 70, preferably at least 74
(g) Gloss: Up to 55% preferably up to 48%

When the thermoplastic resin composition of the present invention is molded using a mold embossed on its surface with a view to achieving low gloss, it is preferable that a gloss change of the embossed surface portion of the mold is up to 1.0 after 2,000 shot cycles.

(2) Applications

The thermoplastic resin composition of the present invention, thanks to the excellent properties as mentioned above, can advertageously be molded into various articles, especially injection-molded automotive interior trims, such as instrument panels, door trims, console boxes and various pillars.

The present invention will now be explained at great length with reference to the following experimental examples.

[I] Measuring Method (1) MFR: measured at 230° C. under a load of 2.16 kg according to ASTM-D1238.

(2) Isotactic Pentad Fraction (P): determined according to the procedure described in "Macromolecule", 8, 687 (1975) using $^{13}$C-NMR.

(3) Melting Temperature: determined from a peak position in a thermogram as obtained by using a differential scanning calorimeter (DSC), when a sample was melted by heating to a temperature of 180° C., then cooled down to a temperature of –100° C. at a cooling rate of 10° C. per minute, and finally heated at a heating rate of 20° C. per minute.

(4) Flexural Modulus: determined at 23° C. and a bending rate of 2 mm per minute according to ASTM-D790.

(5) Impact Resistance: estimated in terms of an Izod impact value at 23° C. according to ASTM-D785.

(6) Elognation in Tension: determined by conducting tensile testing at 23° C. and a tensile rate of 10 mm per minute according to ASTM-D638, and measuring the percentage of elongation.

(7) Surface Hardness: determined by making estimation of a Rockwell hardness at 23° C. on an R scale according to ASTM-D785.

(8) Heat Deformation Temperature (HDT): measured under a load of 4.6 kg according to ASTM-D523.

(9) Gloss: measured at an angle of incidence of 60 degrees according to ASTM-D523.

(10) Mold Contamination: estimated by molding into 350 mm×100 mm×3 mmt test pieces in 2,000 shot cycles using a mold having embosses of 180 to 220 μm in depth, in which additional embosses of 0.5 to 15 μm in depth were provided, and measuring a gloss change of the embossed portion of the mold between the first shot cycle and the 2,000-th shot cycle. A gloss change of up to 1.0 is marked with ○ and a gloss change greater than 1.0 with ×.

(11) The Weather Resistance: estimated using a fadeometer (FAL-AU·H made by Suga Shikenkisha, with a black panel at 83° C. under non-rainy conditions). Samples that cracked within 1,000 hours are marked with ×, and samples that did not with ○. [II] Experimental Examples Examples 1–21 & Comparative Examples 1–21

Starting materials shown in Tables 1 to 7 were blended together at proportions indicated in Tables 8 and 9 with the addition of 0.1 part by weight of an anti-oxidant, tetrakis [methylene-3-(3',5'-di-t-butyl-4'-hydroxyphenyl) propionate]methane (sold by CIBA-GEYGY LTD. under the trade name of Irganox1010). The blend was mixed by use of a super-mixer made by Kawada Seisakusho for 5 minutes, and then kneaded and granulated at a preset temperature of 210° C. by means of a biaxial kneader (FCM made by KOBE STEEL LTD.) to obtain a thermoplastic resin composition.

Thereafter, various test pieces were prepared at a molding temperature of 210° C. using an injection molding machine having a clamping force of 100 tons, and then measured for their properties according to the above measuring method. The results of estimation are reported in Tables 10 and 11.

For making estimation of mold contamination according to the above method, the above test pieces were prepared by carrying out continuous molding in 2,000 shot cycles using a molding machine having a clamping force of 265 tons.

In Examples 1 to 8, a further 10,000-shot molding was conducted to measure a gloss change. The gloss change was found to be less than 1.0.

The results of estimation are reported in Tables 10 and 11.

TABLE 1

Propylene-Ethylene Block Copolymer

| | Propylene Homopolymer Moiety | | Whole Copolymer | |
|---|---|---|---|---|
| Type | MFR g/10 min. | Isotactic Pentad Fraction | MFR g/10 min. | Ethylene Content % by weight |
| PP-1 | 38 | 0.982 | 20 | 4.7 |
| PP-2 | 42 | 0.987 | 27 | 3 |
| PP-3 | 20 | 0.979 | 15 | 6 |
| PP-4 | 39 | 0.976 | 18 | 3.8 |
| PP-5 | 80 | 0.987 | 43 | 3.5 |
| PP-6 | 12 | 0.978 | 9 | 4.9 |
| PP-7 | 33 | 0.962 | 21 | 5.1 |
| PP-8 | 35 | 0.976 | 20 | 7 |

TABLE 2

Ethylene-Propylene Copolymer Rubber

| Type | MFR g/10 min. | Melting Temp. °C. | Propylene Content % by weight |
|---|---|---|---|
| EPR-1 | 0.9 | 43 | 22 |
| EPR-2 | 1.3 | 38 | 23 |
| EPR-3 | 0.3 | 50 | 17 |
| EPR-4 | 2.8 | 45 | 20 |
| EPR-5 | 0.1 | 44 | 22 |
| EPR-6 | 0.6 | 72 | 10 |
| EPR-7 | 0.8 | 20 | 31 |

TABLE 3

Ethylene-α-Olefin Copolymer Rubber

| Type | MFR g/10 min. | Melting Temp. °C. | Density g/cm³ | Comonomer Species |
|---|---|---|---|---|
| PEX-1 | 0.6 | 80 | 0.882 | 1-butene |
| PEX-2 | 1.9 | 88 | 0.889 | 1-butene |
| PEX-3 | 0.4 | 67 | 0.876 | 1-hexene |
| PEX-4 | 2.4 | 66 | 0.877 | 1-hexene |
| PEX-5 | 0.2 | 79 | 0.885 | 1-butene |
| PEX-6 | 0.7 | 106 | 0.909 | 1-butene |
| PEX-7 | 0.6 | 51 | 0.865 | 1-butene |

TABLE 4

(Talc)

| Type | Average Particle Diameter μm | Specific Surface Area m²/g |
|---|---|---|
| Talc-1 | 2.8 | 4.0 |
| Talc-2 | 6.5 | 2.8 |

TABLE 5

(Weather-Resistant Agent)

| Type | Name of Compound |
|---|---|
| HALS-1 LA52 | Tetrakis(1,2,2,6,6-penta-methyl-4-piperidyl)-1,2,3,4-butane tetracarboxylate |
| HALS-2 TINUVIN144 | Bis(1,2,2,6,6-penta-methyl-4-piperidyl-2-butyl-2-(3,5-di-t-butyl-4-hydroxy-benzyl)malonate |
| HALS-3 | Condensate of tris(1,2,3,6,6-penta- |

TABLE 5-continued (Weather-Resistant Agent)

| Type | Name of Compound |
|---|---|
| LA63 | methyl-4-piperidyl-1-2,3,4-butane tetra-carboxylate and β,β,β',β'-tetramethyl-3,9-[2,4,8,10-tetra-oxaspiro(5,5)undecane]diethanol |
| HALS-4 LS770 | Bis(2,2,6,6-tetramethyl-4-piperidyl)sebacate |

TABLE 6

(Anti-Oxidant)

| Type | Name of Compound |
|---|---|
| Stabilizer-1 RA168 | Tris-(2,4-di-t-butylphenyl)phosphite |
| Stabilizer-2 1178 | Tris(nonylphenyl)phosphite |
| Stabilizer-3 PEP8 | Distearyl pentaerythritol diphosphite |

TABLE 7

(Dispersant)

| Type | Name of Compound |
|---|---|
| Metal Salt-1 | Calcium behenate |
| Metal Salt-2 | Magnesium behenate |
| Metal Salt-3 | Zinc behenate |
| Metal Salt-4 | Zinc salt of montanic acid |
| Metal Salt-5 | Magnesium stearate |
| Metal Salt-6 | Zinc stearate |

TABLE 8

| | Components and their amounts | | | | | | | | Additives and their amounts | | | | | | |
|---|---|---|---|---|---|---|---|---|---|---|---|---|---|---|---|
| | PP | | EPR | | PEX | | talc | | Weather-resistant agent | | Phosphorous anti-oxidant | | Metal salt | | RA1010 |
| | Type | Amount wt % | Type | Amount wt % | Type | Amount wt % | Type | Amount wt % | Type | Amount pbw | Type | Amount pbw | Type | Amount pbw | Amount pbw |
| Ex. 1 | PP-1 | 65 | EPR-1 | 5 | PEX-1 | 10 | talc-1 | 20 | HALS-1 | 0.2 | Stabilizer-1 | 0.05 | Metal Salt-1 | 0.4 | 0.1 |
| Ex. 2 | PP-1 | 65 | EPR-1 | 5 | PEX-1 | 10 | talc-1 | 20 | HALS-3 | 0.2 | Stabilizer-1 | 0.05 | Metal Salt-2 | 0.4 | 0.1 |
| Ex. 3 | PP-1 | 65 | EPR-1 | 5 | PEX-1 | 10 | talc-1 | 20 | HALS-2 | 0.2 | Stabilizer-1 | 0.05 | Metal Salt-3 | 0.4 | 0.1 |
| Ex. 4 | PP-1 | 65 | EPR-1 | 5 | PEX-1 | 10 | talc-1 | 20 | HALS-1 | 0.2 | Stabilizer-1 | 0.05 | Metal Salt-4 | 0.4 | 0.1 |
| Ex. 5 | PP-1 | 65 | EPR-1 | 5 | PEX-1 | 10 | talc-1 | 20 | HALS-2 | 0.2 | Stabilizer-1 | 0.15 | Metal Salt-1 | 0.4 | 0.1 |
| Ex. 6 | PP-1 | 65 | EPR-1 | 5 | PEX-1 | 10 | talc-1 | 20 | HALS-1 | 0.2 | Stabilizer-2 | 0.05 | Metal Salt-2 | 0.4 | 0.1 |
| Ex. 7 | PP-1 | 65 | EPR-1 | 5 | PEX-1 | 10 | talc-1 | 20 | HALS-2 | 0.2 | Stabilizer-1 | 0.05 | Metal Salt-1 | 0.4 | 0.1 |
| Ex. 8 | PP-1 | 65 | EPR-1 | 5 | PEX-1 | 10 | talc-1 | 20 | HALS-3 | 0.2 | Stabilizer-1 | 0.05 | Metal Salt-1 | 0.4 | 0.1 |
| Ex. 9 | PP-1 | 65 | EPR-1 | 5 | PEX-1 | 10 | talc-1 | 20 | HALS-1 | 0.5 | Stabilizer-1 | 0.05 | Metal Salt-1 | 0.4 | 0.1 |
| Ex. 10 | PP-1 | 65 | EPR-2 | 5 | PEX-2 | 10 | talc-1 | 20 | HALS-1 | 0.2 | Stabilizer-1 | 0.05 | Metal Salt-1 | 1.5 | 0.1 |
| Ex. 11 | PP-1 | 65 | EPR-1 | 10 | PEX-1 | 5 | talc-1 | 20 | HALS-1 | 0.2 | Stabilizer-1 | 0.05 | Metal Salt-1 | 0.4 | 0.1 |
| Ex. 12 | PP-1 | 65 | EPR-1 | 0 | PEX-1 | 15 | talc-1 | 20 | HALS-2 | 0.2 | Stabilizer-1 | 0.05 | Metal Salt-3 | 0.4 | 0.1 |

TABLE 8-continued

| | Components and their amounts | | | | | | | | Additives and their amounts | | | | | |
| --- | --- | --- | --- | --- | --- | --- | --- | --- | --- | --- | --- | --- | --- | --- |
| | PP | | EPR | | PEX | | talc | | Weather-resistant agent | | Phosphorous anti-oxidant | | Metal salt | RA1010 |
| | Type | Amount wt % | Type | Amount wt % | Type | Amount wt % | Type | Amount wt % | Type | Amount pbw | Type | Amount pbw | Type | Amount pbw | Amount pbw |
| Ex. 13 | PP-1 | 70 | EPR-1 | 5 | PEX-1 | 5 | talc-1 | 20 | HALS-3 | 0.2 | Stabilizer-1 | 0.05 | Metal Salt-3 | 0.4 | 0.1 |
| Ex. 14 | PP-1 | 60 | EPR-1 | 10 | PEX-1 | 10 | talc-1 | 20 | HALS-1 | 0.2 | Stabilizer-1 | 0.05 | Metal Salt-3 | 0.4 | 0.1 |
| Ex. 15 | PP-2 | 65 | EPR-1 | 5 | PEX-1 | 10 | talc-1 | 20 | HALS-2 | 0.2 | Stabilizer-1 | 0.05 | Metal Salt-1 | 0.4 | 0.1 |
| Ex. 16 | PP-3 | 65 | EPR-1 | 5 | PEX-1 | 10 | talc-1 | 20 | HALS-3 | 0.2 | Stabilizer-1 | 0.05 | Metal Salt-3 | 0.4 | 0.1 |
| Ex. 17 | PP-4 | 65 | EPR-1 | 5 | PEX-1 | 10 | talc-1 | 20 | HALS-1 | 0.2 | Stabilizer-1 | 0.05 | Metal Salt-1 | 0.4 | 0.1 |
| Ex. 18 | PP-1 | 65 | EPR-2 | 5 | PEX-2 | 10 | talc-1 | 20 | HALS-2 | 0.2 | Stabilizer-1 | 0.05 | Metal Salt-3 | 0.4 | 0.1 |
| Ex. 19 | PP-1 | 65 | EPR-3 | 5 | PEX-3 | 10 | talc-1 | 20 | HALS-3 | 0.2 | Stabilizer-1 | 0.05 | Metal Salt-1 | 0.4 | 0.1 |
| Ex. 20 | PP-1 | 60 | EPR-1 | 5 | PEX-1 | 10 | talc-1 | 25 | HALS-1 | 0.2 | Stabilizer-1 | 0.05 | Metal Salt-3 | 0.4 | 0.1 |
| Ex. 21 | PP-1 | 70 | EPR-1 | 5 | PEX-1 | 10 | talc-1 | 15 | HALS-1 | 0.2 | Stabilizer-1 | 0.05 | Metal Salt-1 | 0.4 | 0.1 |

TABLE 9

| | Components and their amounts | | | | | | | | Additives and their amounts | | | | | |
| --- | --- | --- | --- | --- | --- | --- | --- | --- | --- | --- | --- | --- | --- | --- |
| | PP | | EPR | | PEX | | talc | | Weather-resistant agent | | Phosphorus anti-oxidant | | Metal salt | RA1010 |
| | Type | Amount wt % | Type | Amount wt % | Type | Amount wt % | Type | Amount wt % | Type | Amount pbw | Type | Amount pbw | Type | Amount pbw | Amount pbw |
| Comp. Ex. 1 | PP-1 | 65 | EPR-1 | 5 | PEX-1 | 10 | talc-1 | 20 | none | 0 | Stabilizer-1 | 0.05 | Metal Salt-1 | 0.4 | 0.1 |
| Comp. Ex. 2 | PP-1 | 65 | EPR-1 | 5 | PEX-1 | 10 | talc-1 | 20 | HALS-2 | 0.2 | Stabilizer-1 | 0.05 | Metal Salt-5 | 0.4 | 0.1 |
| Comp. Ex. 3 | PP-1 | 65 | EPR-1 | 5 | PEX-1 | 10 | talc-1 | 20 | HALS-1 | 0.2 | Stabilizer-1 | 0.05 | Metal Salt-6 | 0.4 | 0.1 |
| Comp. Ex. 4 | PP-1 | 65 | EPR-1 | 5 | PEX-1 | 10 | talc-1 | 20 | HALS-4 | 0.2 | Stabilizer-1 | 0.05 | Metal Salt-3 | 0.4 | 0.1 |
| Comp. Ex. 5 | PP-1 | 65 | EPR-1 | 5 | PEX-1 | 10 | talc-1 | 20 | HALS-1 | 0.2 | Stabilizer-1 | 0.15 | Metal Salt-1 | 6 | 0.1 |
| Comp. Ex. 6 | PP-1 | 65 | EPR-1 | 5 | PEX-1 | 10 | talc-1 | 20 | HALS-1 | 5.5 | Stabilizer-1 | 0.05 | Metal Salt-3 | 0.4 | 0.1 |
| Comp. Ex. 7 | PP-1 | 65 | EPR-1 | 5 | PEX-1 | 10 | talc-1 | 20 | HALS-1 | 0.2 | Stabilizer-3 | 0.05 | Metal Salt-1 | 0.4 | 0.1 |
| Comp. Ex. 8 | PP-1 | 60 | EPR-1 | 15 | PEX-1 | 5 | talc-1 | 20 | HALS-1 | 0.2 | Stabilizer-1 | 0.05 | Metal Salt-1 | 0.4 | 0.1 |
| Comp. Ex. 9 | PP-1 | 60 | EPR-1 | 0 | PEX-1 | 20 | talc-1 | 20 | HALS-2 | 0.2 | Stabilizer-1 | 0.05 | Metal Salt-3 | 0.4 | 0.1 |
| Comp. Ex. 10 | PP-1 | 70 | EPR-1 | 10 | PEX-1 | 0 | talc-1 | 20 | HALS-3 | 0.2 | Stabilizer-1 | 0.05 | Metal Salt-3 | 0.4 | 0.1 |
| Comp. Ex. 11 | PP-1 | 54 | EPR-1 | 10 | PEX-1 | 16 | talc-1 | 20 | HALS-1 | 0.2 | Stabilizer-1 | 0.05 | Metal Salt-3 | 0.4 | 0.1 |
| Comp. Ex. 12 | PP-1 | 76 | EPR-1 | 0 | PEX-1 | 4 | talc-1 | 20 | HALS-2 | 0.2 | Stabilizer-1 | 0.05 | Metal Salt-1 | 0.4 | 0.1 |
| Comp. Ex. 13 | PP-5 | 75 | EPR-1 | 5 | PEX-1 | 10 | talc-1 | 10 | HALS-3 | 0.2 | Stabilizer-1 | 0.05 | Metal Salt-3 | 0.4 | 0.1 |
| Comp. Ex. 14 | PP-6 | 55 | EPR-1 | 5 | PEX-1 | 10 | talc-1 | 30 | HALS-1 | 0.2 | Stabilizer-1 | 0.05 | Metal Salt-1 | 0.4 | 0.1 |
| Comp. Ex. 15 | PP-7 | 65 | EPR-1 | 5 | PEX-1 | 10 | talc-1 | 20 | HALS-2 | 0.2 | Stabilizer-1 | 0.05 | Metal Salt-3 | 0.4 | 0.1 |
| Comp. Ex. 16 | PP-8 | 65 | EPR-1 | 5 | PEX-1 | 10 | talc-1 | 20 | HALS-3 | 0.2 | Stabilizer-1 | 0.05 | Metal Salt-1 | 0.4 | 0.1 |
| Comp. Ex. 17 | PP-1 | 65 | EPR-4 | 5 | PEX-4 | 10 | talc-1 | 20 | HALS-1 | 0.2 | Stabilizer-1 | 0.05 | Metal Salt-3 | 0.4 | 0.1 |
| Comp. Ex. 18 | PP-1 | 65 | EPR-5 | 5 | PEX-5 | 10 | talc-1 | 20 | HALS-1 | 0.2 | Stabilizer-1 | 0.05 | Metal Salt-1 | 0.4 | 0.1 |

TABLE 9-continued

|  | Components and their amounts | | | | | | | | Additives and their amounts | | | | | |
|  | PP | | EPR | | PEX | | talc | | Weather-resistant agent | | Phosphorus anti-oxidant | | Metal salt | | RA1010 |
|  | Type | Amount wt % | Type | Amount wt % | Type | Amount wt % | Type | Amount wt % | Type | Amount pbw | Type | Amount pbw | Type | Amount pbw | Amount pbw |
|---|---|---|---|---|---|---|---|---|---|---|---|---|---|---|---|
| Comp. Ex. 19 | PP-1 | 65 | EPR-6 | 5 | PEX-6 | 10 | talc-1 | 20 | HALS-2 | 0.2 | Stabilizer-1 | 0.05 | Metal Salt-1 | 0.4 | 0.1 |
| Comp. Ex. 20 | PP-1 | 65 | EPR-7 | 5 | PEX-7 | 10 | talc-1 | 20 | HALS-3 | 0.2 | Stabilizer-1 | 0.05 | Metal Salt-3 | 0.4 | 0.1 |
| Comp. Ex. 21 | PP-1 | 65 | EPR-1 | 5 | PEX-1 | 10 | talc-2 | 20 | HALS-1 | 0.2 | Stabilizer-1 | 0.05 | Metal Salt-1 | 0.4 | 0.1 |

TABLE 10

|  | MFR (g/10 min.) | Flexural modulus (kg/cm$^2$) | IZOD impact strength (kg·cm/cm) | Elongation intension (%) | HDT | Surface hardness | Gloss (%) | Prevention of mold contamination | Weather resistance |
|---|---|---|---|---|---|---|---|---|---|
| Ex. 1 | 13 | 24,800 | 20 | 300 or more | 130 | 80 | 31 | ○ | ○ |
| Ex. 2 | 13 | 24,300 | 24 | 300 or more | 128 | 80 | 32 | ○ | ○ |
| Ex. 3 | 12 | 24,100 | 20 | 300 or more | 129 | 79 | 32 | ○ | ○ |
| Ex. 4 | 12 | 24,400 | 24 | 300 or more | 127 | 79 | 30 | ○ | ○ |
| Ex. 5 | 11 | 25,000 | 24 | 300 or more | 127 | 80 | 28 | ○ | ○ |
| Ex. 6 | 11 | 25,000 | 23 | 300 or more | 129 | 80 | 31 | ○ | ○ |
| Ex. 7 | 13 | 25,100 | 19 | 300 or more | 131 | 81 | 33 | ○ | ○ |
| Ex. 8 | 11 | 24,400 | 20 | 300 or more | 128 | 78 | 30 | ○ | ○ |
| Ex. 9 | 11 | 24,100 | 23 | 300 or more | 130 | 79 | 29 | ○ | ○ |
| Ex. 10 | 13 | 24,300 | 21 | 300 or more | 130 | 80 | 29 | ○ | ○ |
| Ex. 11 | 12 | 24,300 | 26 | 235 | 129 | 75 | 29 | ○ | ○ |
| Ex. 12 | 13 | 25,100 | 17 | 300 or more | 132 | 86 | 28 | ○ | ○ |
| Ex. 13 | 19 | 28,000 | 18 | 214 | 135 | 87 | 34 | ○ | ○ |
| Ex. 14 | 10 | 21,400 | 33 | 300 or more | 123 | 76 | 44 | ○ | ○ |
| Ex. 15 | 16 | 25,900 | 20 | 271 | 129 | 81 | 27 | ○ | ○ |
| Ex. 16 | 11 | 23,300 | 31 | 300 or more | 122 | 78 | 31 | ○ | ○ |
| Ex. 17 | 12 | 22,000 | 21 | 300 or more | 124 | 74 | 30 | ○ | ○ |
| Ex. 18 | 16 | 24,000 | 29 | 300 or more | 130 | 75 | 45 | ○ | ○ |
| Ex. 19 | 11 | 24,800 | 19 | 300 or more | 132 | 80 | 20 | ○ | ○ |
| Ex. 20 | 9 | 28,800 | 16 | 300 or more | 133 | 78 | 27 | ○ | ○ |
| Ex. 21 | 18 | 21,500 | 22 | 300 or more | 126 | 80 | 36 | ○ | ○ |

TABLE 11

|  | MFR (g/10 min.) | Flexural modulus (kg/cm$^2$) | IZOD Impact strength (kg·cm/cm) | Elongation intension (%) | HDT | Surface hardness | Gloss (%) | Prevention of mold contamination | Weather resistance |
|---|---|---|---|---|---|---|---|---|---|
| Comp. Ex. 1 | 13 | 25,000 | 21 | 300 or more | 130 | 81 | 30 | ○ | x |
| Comp. Ex. 2 | 12 | 24,100 | 22 | 300 or more | 129 | 80 | 30 | x | ○ |
| Comp. Ex. 3 | 12 | 24,500 | 23 | 300 or more | 128 | 80 | 29 | x | ○ |
| Comp. Ex. 4 | 11 | 24,800 | 19 | 300 or more | 129 | 80 | 31 | x | ○ |
| Comp. Ex. 5 | 15 | 24,000 | 18 | 300 or more | 128 | 80 | 31 | x | ○ |
| Comp. Ex. 6 | 14 | 24,200 | 22 | 300 or more | 130 | 81 | 30 | x | ○ |
| Comp. Ex. 7 | 12 | 24,000 | 20 | 300 or more | 130 | 79 | 29 | x | ○ |
| Comp. Ex. 8 | 10 | 22,300 | 34 | 280 | 123 | 58 | 40 | ○ | ○ |
| Comp. Ex. 9 | 9 | 21,800 | 25 | 300 or more | 125 | 66 | 42 | ○ | ○ |
| Comp. Ex. 10 | 14 | 27,600 | 19 | 110 | 133 | 80 | 30 | ○ | ○ |
| Comp. Ex. 11 | 17 | 17,900 | 47 | 300 or more | 117 | 69 | 45 | ○ | ○ |
| Comp. Ex. 12 | 26 | 35,000 | 10 | 50 | 138 | 91 | 29 | ○ | ○ |
| Comp. Ex. 13 | 29 | 18,400 | 13 | 170 | 126 | 82 | 31 | ○ | ○ |
| Comp. Ex. 14 | 5 | 31,700 | 14 | 300 or more | 135 | 79 | 24 | ○ | ○ |
| Comp. Ex. 15 | 13 | 17,300 | 26 | 300 or more | 122 | 76 | 30 | ○ | ○ |
| Comp. Ex. 16 | 13 | 20,900 | 26 | 300 or more | 114 | 73 | 35 | ○ | ○ |
| Comp. Ex. 17 | 19 | 24,400 | 25 | 300 or more | 128 | 78 | 61 | ○ | ○ |
| Comp. Ex. 18 | 9 | 25,500 | 12 | 250 | 132 | 81 | 16 | ○ | ○ |
| Comp. Ex. 19 | 11 | 25,700 | 12 | 240 | 130 | 89 | 30 | ○ | ○ |
| Comp. Ex. 20 | 13 | 24,400 | 28 | 300 or more | 128 | 63 | 28 | ○ | ○ |
| Comp. Ex. 21 | 14 | 23,000 | 12 | 270 | 125 | 80 | 26 | ○ | ○ |

What we claim is:

1. A thermoplastic resin composition improved in terms of prevention of mold contamination, comprising the following components (A) to (G):
   component (A): 55 to 75% by weight of a propylene-ethylene block copolymer containing a propylene homopolymer moiety having a melt flow rate of 15 to 50 g/10 min. and an isotactic pentad fraction of at least 0.97, said block copolymer having a melt flow rate of 10 to 28 g/10 min. and an ethylene content of 2 to 6% by weight,
   component (B): 0 to 10% by weight of an ethylene-propylene copolymer rubber having a melting temperature of 30° to 60° C. and a melt flow rate of 0.2 to 2 g/10 min.,
   component (C): 5 to 15% by weight of an ethylene-α-olefin copolymer rubber having a melting temperature of 60° to 100° C. and a melt flow rate of 0.3 to 2 g/10 min.,
   component (D): 15 to 25% by weight of a talc having an average particle diameter of up to 5 μm and a specific surface area of at least 3.5 m²/g,
   the total amount of components (A) to (D) being 100% by weight,
   component (E): 0.05 to 2 parts by weight of a hindered amine having a group represented by the following formula (I):

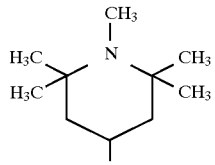   (I)

component (F): 0.01 to 1 part by weight of a triaryl phosphite, and
   component (G): 0.05 to 4 parts by weight of a metal salt represented by the following general formula (VII):

$(RCOO)_2 X$   (VII)

wherein R is a monovalent hydrocarbon group having a molecular weight of 290 to 500, and X is zinc, magnesium or calcium,
   the respective amounts of components (E) to (G) being based on 100 parts by weight of the sum of components (A) to (D).

2. The thermoplastic resin composition according to claim 1, wherein said composition has a melt flow rate of at least 8 g/10 min., a flexural modulus of at least 20,000 kg/cm² at 23° C., an Izod impact value of at least 15 kg·cm/cm, an elongation in tension of at least 200%, a heat deformation temperature of at least 120° C., and a Rockwell hardness of at least 70.

3. The thermoplastic resin composition according to claim 1, wherein when said composition is molded using a mold with an embossed surface, a gloss change on the embossed surface of said mold is up to 1.0 after 2,000 shot cycles.

4. The thermoplastic resin composition according to claim 1, wherein the ethylene-α-olefin copolymer rubber of components (c) is an ethylene-butene-1 copolymer rubber.

5. The thermoplastic resin composition according to claim 1, wherein the hindered amine of component (E) has one of the following general formulae:

   (II)

wherein $R^1$ represents the above formula (I), and m is 1 or

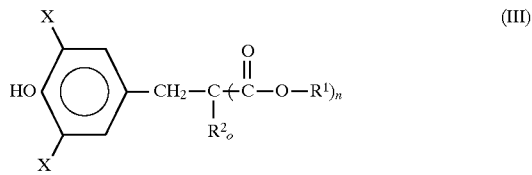   (III)

wherein X represents t-butyl, $R^1$ represents the above formula (I), $R^2$ represents an alkyl group having 3 or more carbon atoms, n is an integer of 3 or more and 0 is an integer of 0 to 2, provided that n+0=3;

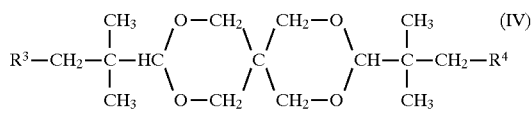   (IV)

wherein $R^3$ and $R^4$ each represent

   (V)

   (VI)

wherein $R^1$ represents the above formula (I), and p and q each are an integer of 1 or 2.

6. The thermoplastic resin composition according to claim 1, wherein the triaryl phosphite of component (F) has the following general formula (VII):

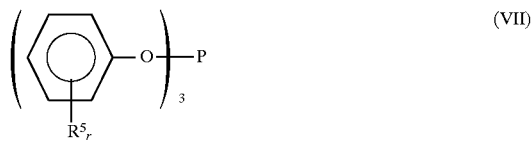   (VII)

wherein $R^5$ represents a hydrocarbon group having 4 to 10 carbon atoms, and r is 1, 2 or 3.

* * * * *